(12) United States Patent
Berwanger et al.

(10) Patent No.: US 10,428,887 B2
(45) Date of Patent: Oct. 1, 2019

(54) HYBRID STRUCTURAL APPARATUS FOR A VEHICLE AIR BRAKING SYSTEM

(71) Applicant: Bendix Spicer Foundation Brake LLC, Elyria, OH (US)

(72) Inventors: Fred W Berwanger, Edwardsburg, MI (US); Daniel E Banks, Climax, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 38 days.

(21) Appl. No.: 15/657,763

(22) Filed: Jul. 24, 2017

(65) Prior Publication Data

US 2019/0024739 A1   Jan. 24, 2019

(51) Int. Cl.
| | |
|---|---|
| *F16D 65/22* | (2006.01) |
| *F16D 65/28* | (2006.01) |
| *F16D 65/10* | (2006.01) |
| *F16D 51/22* | (2006.01) |
| *F16D 65/02* | (2006.01) |
| *F16D 125/30* | (2012.01) |

(52) U.S. Cl.
CPC ............ *F16D 65/28* (2013.01); *F16D 51/22* (2013.01); *F16D 65/10* (2013.01); *F16D 2065/1388* (2013.01); *F16D 2065/1392* (2013.01); *F16D 2125/30* (2013.01)

(58) Field of Classification Search
CPC ...... B60T 17/088; B60T 17/083; B60T 17/08; B60T 13/38; F16D 2051/003; F16D 2125/30; F16D 2125/56; F16D 2125/04; F16D 65/22; F16D 65/0056; F16D 2121/04; F16D 2200/003; F16D 2200/0021; F16D 2250/0007; F16D 2250/0076; F16D 65/09; F16D 2121/08; F16D 2121/10; F16D 2121/12

See application file for complete search history.

(56) References Cited

U.S. PATENT DOCUMENTS 2,892,662 A   6/1959  Scheel
3,076,531 A * 2/1963  Fisher .................. F16D 65/22
                                          188/196 R (Continued)

OTHER PUBLICATIONS

European Patent Office, "Invitation to pay additional Fees" and "Communication relating to the results of the partial international search," Report, Nov. 19, 2018, 14 pages, European Patent Office, Rijswijk Netherlands.

*Primary Examiner* — Bradley T King
*Assistant Examiner* — Stephen M Bowes
(74) *Attorney, Agent, or Firm* — Cheryl Greenly; Brian Kondas; Eugene Clair

(57) ABSTRACT

A hybrid structural apparatus is provided for a vehicle air braking system. The hybrid structural apparatus comprises a member including a non-pressure plate of a brake actuator and an arm portion that extends from the non-pressure plate. The member is made of a first material. The hybrid structural apparatus further comprises a first flange made of a second material fastened to the arm portion of the member. The second material is different from the first material. The hybrid structural apparatus also includes a second flange for fastening to a brake spider, and a camshaft support tube interconnecting the first and second flanges.

8 Claims, 5 Drawing Sheets

(56) References Cited

U.S. PATENT DOCUMENTS

| | | | | |
|---|---|---|---|---|
| 5,887,687 | A | * | 3/1999 | Williams ................ F16D 51/22 |
| | | | | 188/330 |
| 6,279,695 | B1 | | 8/2001 | Davison |
| 8,127,903 | B2 | | 3/2012 | Scheckelhoff |
| 9,303,703 | B2 | | 4/2016 | Banks |
| 9,574,626 | B1 | | 2/2017 | Berwanger |
| 2006/0170279 | A1 | * | 8/2006 | Ebert ........................ B23P 6/00 |
| | | | | 301/130 |
| 2012/0145839 | A1 | * | 6/2012 | Runels ...................... F16L 3/18 |
| | | | | 248/74.4 |
| 2013/0275018 | A1 | * | 10/2013 | Todd ....................... F16D 66/00 |
| | | | | 701/70 |
| 2014/0246280 | A1 | | 9/2014 | Jones |
| 2015/0047931 | A1 | | 2/2015 | Banks |
| 2015/0075926 | A1 | * | 3/2015 | Moss ...................... F16D 51/00 |
| | | | | 188/219.1 |
| 2015/0377310 | A1 | * | 12/2015 | Jones ...................... F16D 65/28 |
| | | | | 188/329 |
| 2015/0377311 | A1 | * | 12/2015 | Okuma .................. F16D 66/00 |
| | | | | 188/1.11 E |
| 2016/0158879 | A1 | | 6/2016 | Moss |
| 2017/0030422 | A1 | | 2/2017 | Berwanger |

\* cited by examiner

HYBRID STRUCTURAL APPARATUS FOR A VEHICLE AIR BRAKING SYSTEM

BACKGROUND

The present application relates to vehicle air braking systems, and is particularly directed to a hybrid structural apparatus for a vehicle air braking system, such as a heavy vehicle air braking system that includes a drum brake assembly.

A typical drum brake assembly includes a brake shoe that engages a wheel drum to transmit braking torque through a brake spider to a wheel axle. One end of the brake shoe is pivotable against an anchor pin that is attached to one side of the brake spider. A cam follower roller is disposed at the other end of the brake shoe. When a service brake application occurs, a camshaft located on the side of the brake spider opposite the anchor pin is actuated to rotate about its longitudinal central axis. As the camshaft rotates about its longitudinal central axis, a cam surface of an S-cam mounted on the camshaft acts against the cam follower roller to pivot the brake shoe about the anchor pin. As the brake shoe pivots about the anchor pin, the lining of the brake shoe frictionally engages the wheel drum to transmit braking torque through the brake spider to the wheel axle and thereby to decelerate and brake the vehicle.

In S-cam drum brakes, a cam bracket supports and orients the camshaft and provides a mounting interface for a brake actuator. The cam bracket resists the torque of the camshaft and the linear load of the brake actuator, as well as any vibration-induced loads. Some known cam brackets are made entirely of either ferrous or aluminum alloys having dramatically different material properties. Accordingly, those skilled in the art continue with research and development efforts in cam brackets for S-cam drum brakes.

SUMMARY

In accordance with one example embodiment, a hybrid structural apparatus is provided for a vehicle air braking system. The hybrid structural apparatus comprises a member including a non-pressure plate of a brake actuator and an arm portion that extends from the non-pressure plate. The member is made of a first material. The hybrid structural apparatus further comprises a first flange made of a second material fastened to the arm portion of the member. The second material is different from the first material. The hybrid structural apparatus also includes a second flange for fastening to a brake spider, and a camshaft support tube interconnecting the first and second flanges.

In accordance with another example embodiment, a hybrid structural apparatus is provided for a vehicle air braking system. The hybrid structural apparatus comprises a member including a non-pressure plate of a brake actuator and an arm portion that extends from the non-pressure plate. The member is made of cast aluminum. The hybrid structural apparatus further comprises a first flange made of material other than cast aluminum and fastened to the arm portion of the member, and a second flange made of material other than cast aluminum and for fastening to a brake spider. The hybrid structural apparatus also comprises a camshaft support tube made of material other than cast aluminum and interconnecting the first and second flanges.

In accordance with yet another example embodiment, a hybrid structural apparatus is provided for a vehicle air braking system. The hybrid structural apparatus comprises a first apparatus portion made of cast aluminum, and a second apparatus portion made of steel. The hybrid structural apparatus further comprises first fastening means for fastening the first and second apparatus portions together so as to modify an overall weight profile of the vehicle air braking system and thereby to modify a vibration frequency of the vehicle air braking system to mitigate brake noise or vibration generated by the vehicle air braking system.

DETAILED DESCRIPTION

Figure 1:
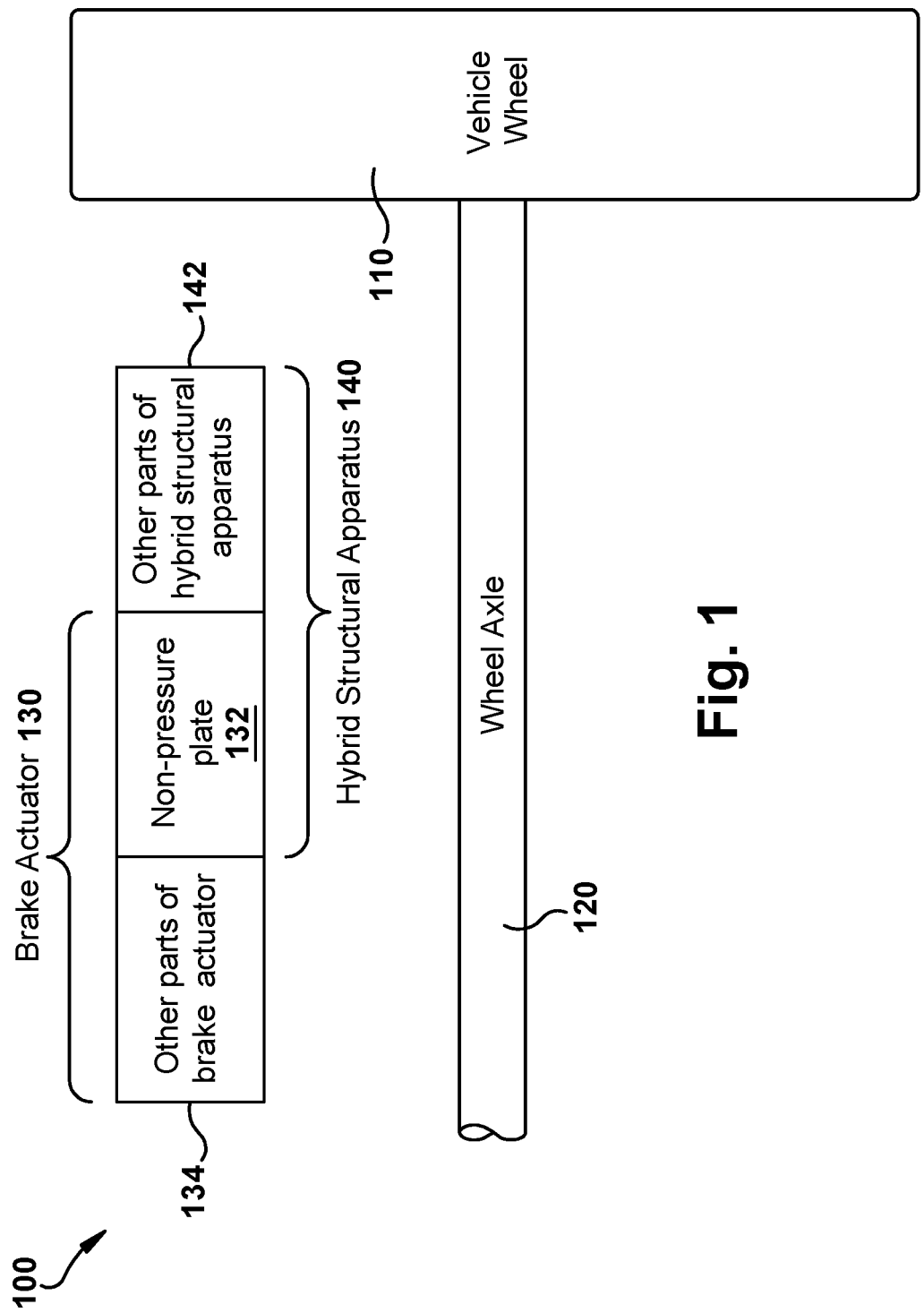
FIG. 1 is a schematic block representation of a portion of an example embodiment.

Referring to FIG. 1, a schematic block representation of a portion of an example vehicle air braking system embodying a hybrid structural apparatus in accordance with an embodiment is illustrated. A vehicle air braking system 100 includes a vehicle wheel 110 that is operatively connected to a wheel axle 120 in conventional manner. The vehicle air braking system 100 further includes a brake actuator 130 that has a non-pressure plate 132 and other parts 134 of the brake actuator 130. Structure and operation of brake actuators that have a non-pressure plate are known and, therefore, will not be described.

The vehicle air braking system 100 also includes a hybrid structural apparatus 140 constructed in accordance with an example embodiment, as will be described herein. As shown in the example implementation of FIG. 1, the hybrid structural apparatus 140 comprises the non-pressure plate 132 of the brake actuator 130 and other parts 142 of the hybrid structural apparatus 140. The other parts 142 of the hybrid structural apparatus 140 may include any combination vehicle brake components including, but not limited to, a camshaft support tube, a brake spider, and fasteners, for example.

Figure 2:
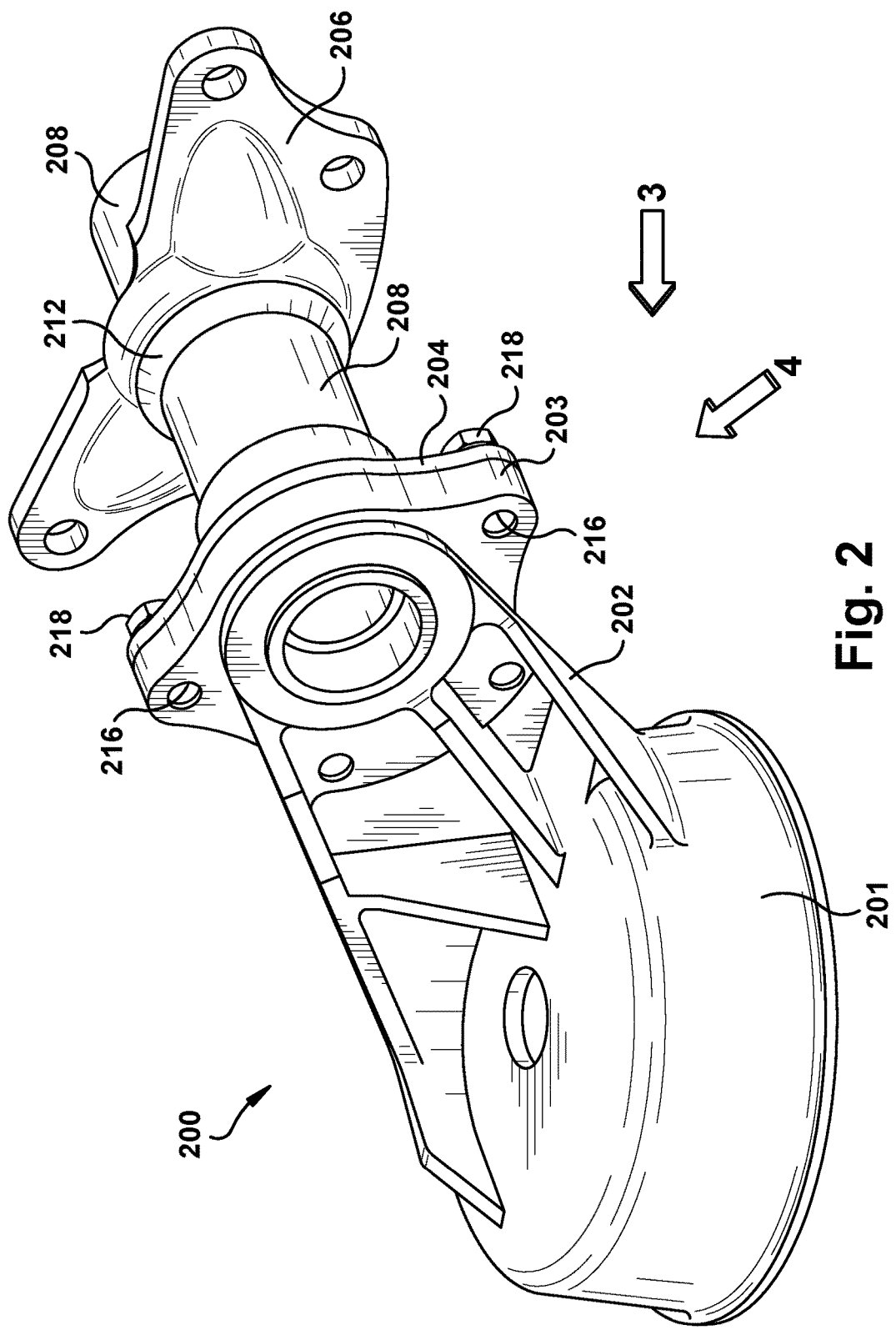
FIG. 2 is a perspective view of an example implementation of the hybrid structural apparatus of FIG. 1 in accordance with an embodiment.
Figure 3:
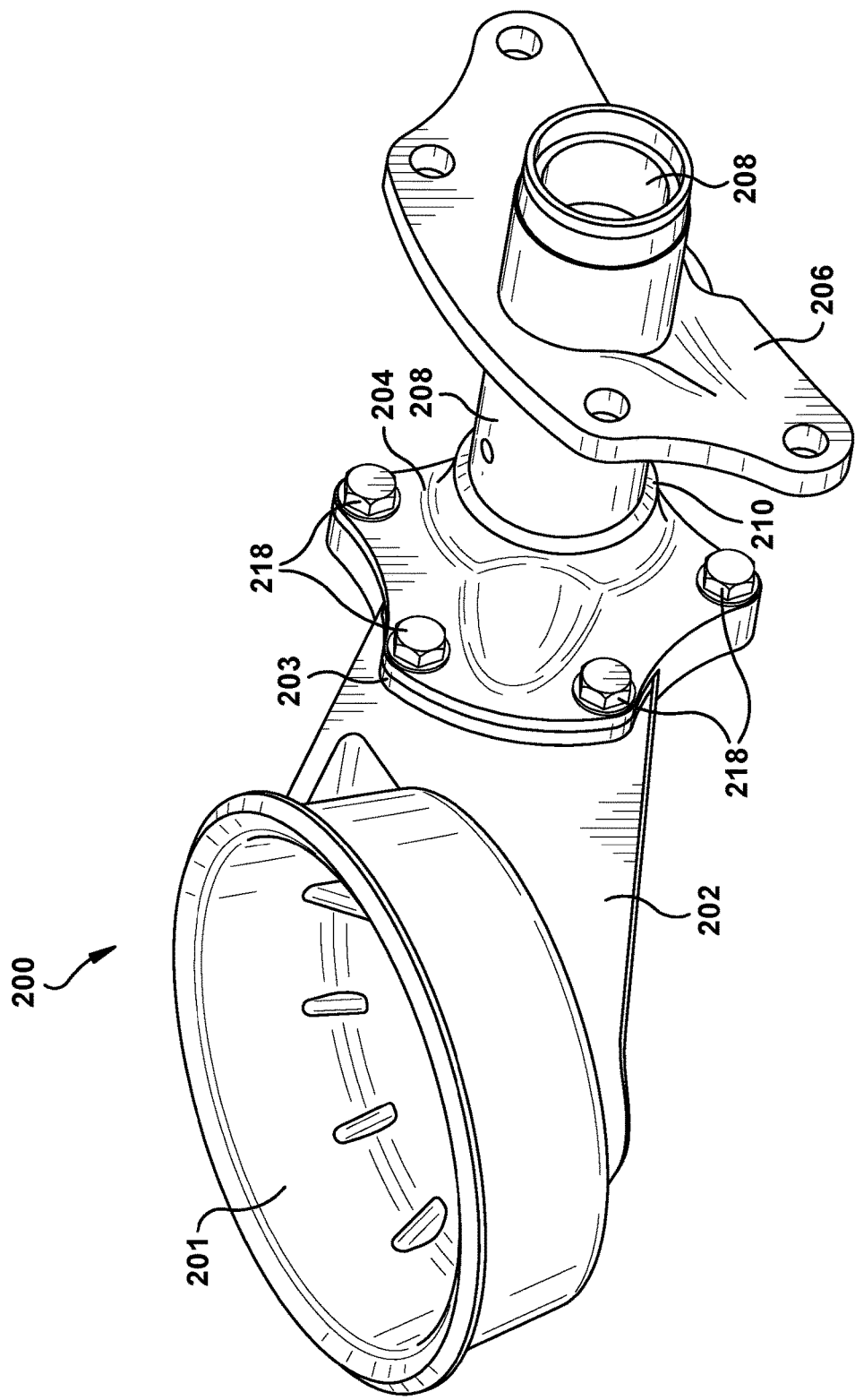
FIG. 3 is a perspective view, looking approximately in the direction of arrow "3" shown in FIG. 2, which arrow is pointing out of the page and slightly upwards in FIG. 2.
Figure 4:
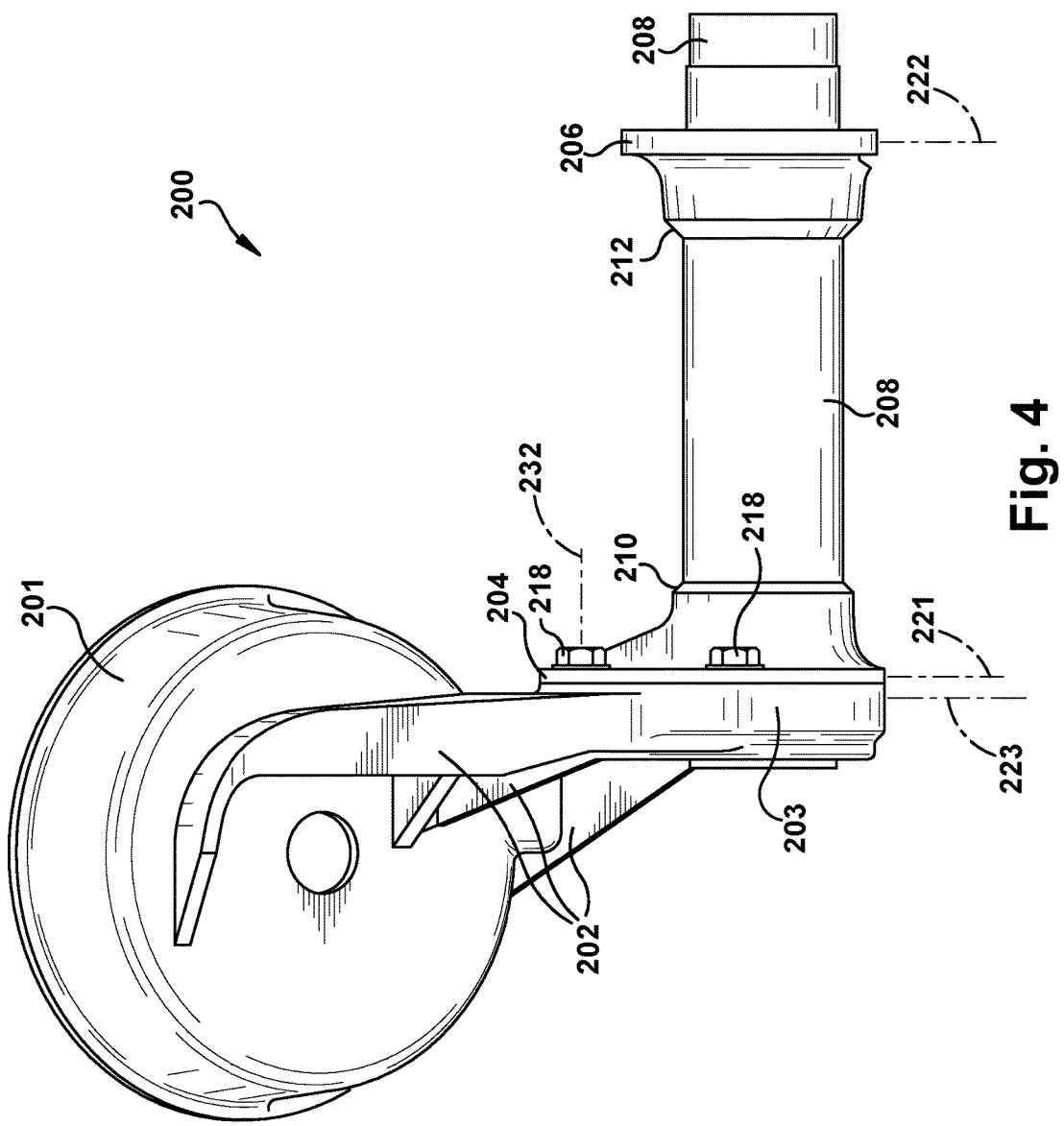
FIG. 4 is a perspective view, looking approximately in the direction of arrow "4" shown in FIG. 2, which arrow is pointing into the page and slightly to the left in FIG. 2.

Referring to FIG. 2, a perspective view of an example implementation of the hybrid structural apparatus 140 of FIG. 1 in accordance with an embodiment is illustrated. FIG. 3 is a perspective view, looking approximately in the direction of arrow "3" shown in FIG. 2, which arrow is pointing out of the page and slightly upwards in FIG. 2. FIG. 4 is a perspective view, looking approximately in the direction of arrow "4" shown in FIG. 2, which arrow is pointing into the page and slightly to the left in FIG. 2.

As shown in FIGS. 2-4, a hybrid structural apparatus 200 comprises a member including a non-pressure plate 201 of a brake actuator, an arm portion 202 that extends from the non-pressure plate 201, and a flange portion 203 that extends from the arm portion 202. The non-pressure plate 201 is connected through the arm portion 202 to the flange portion 203. The member (i.e., the non-pressure plate 201, the arm portion 202, and the flange portion 203) is made of a first material. The hybrid structural apparatus 200 further includes a first flange 204 made of a second material fastened to the flange portion 203. The second material of the first flange 204 is different from the first material of the non-pressure plate 201, the arm portion 202, and the flange portion 203. The hybrid structural apparatus 200 also includes a second flange 206 for fastening to a brake spider, and a camshaft support tube 208 that interconnects the first and second flanges 204, 206.

The first material of the non-pressure plate 201, the arm portion 202, and the flange portion 203 comprises cast aluminum. Since aluminum has lower density, thicker sections can be cast in areas susceptible to vibration. Casting allows freedom to distribute material where it is needed. The material may comprise a different material. For example, the material of the non-pressure plate 201, the arm portion 202, and the flange portion 203 may comprise magnesium alloy. The second material of the first flange 204 comprises steel. The second flange 206 comprises steel, and the camshaft support tube 208 comprises steel. The material may comprise a different material. For example, the material of the first flange 204, the second flange 206, and the camshaft support tube 208 may comprise ductile iron. In another example, the first material may comprise a plastic material, such as a fiber reinforced plastic (FRP).

A first steel weld 210 (FIGS. 3 and 4) is disposed between the first flange 204 and the camshaft support tube 208 to connect the first flange 204 and the camshaft support tube 208 together. A second steel weld 212 (FIGS. 2 and 4) is disposed between the second flange 206 and the camshaft support tube 208 to connect the second flange 206 and the camshaft support tube 208 together. The welds may comprise fillet welds, or for compactness, V-joint welds.

The flange portion 203 has a number of self-locking thread inserts 216 (best shown in FIG. 2) facing the first flange 204. A number of bolts 218 pass through a corresponding number of bolt holes in the first flange 204 to engage the self-locking thread inserts 216 to fasten the first flange 204 and the flange portion 203 together. Other types of fasteners are possible. For example, socket head bolts may be used to provide more compactness.

The first flange 204 lies in a substantially flat first plane 221 (FIG. 4). The second flange 206 lies in a substantially flat second plane 222. The flange portion 203 lies in a substantially flat third plane 223. The first, second, and third planes 221, 222, 223 are substantially parallel to each other. Each of the bolts 218 has a longitudinal central axis 232 (only one longitudinal central axis 232 shown in FIG. 4). The second flange 206 is fastenable to a brake spider.

Accordingly, the hybrid structural apparatus 200 comprises two apparatus portions. The non-pressure plate 201, the arm portion 202, and the flange portion 203 comprise a first apparatus portion made of cast aluminum. The first flange 204, the second flange 206, and the camshaft support tube 208 that interconnects the first flange 204 and the second flange 206 comprise a second apparatus portion made of steel.

Figure 5:
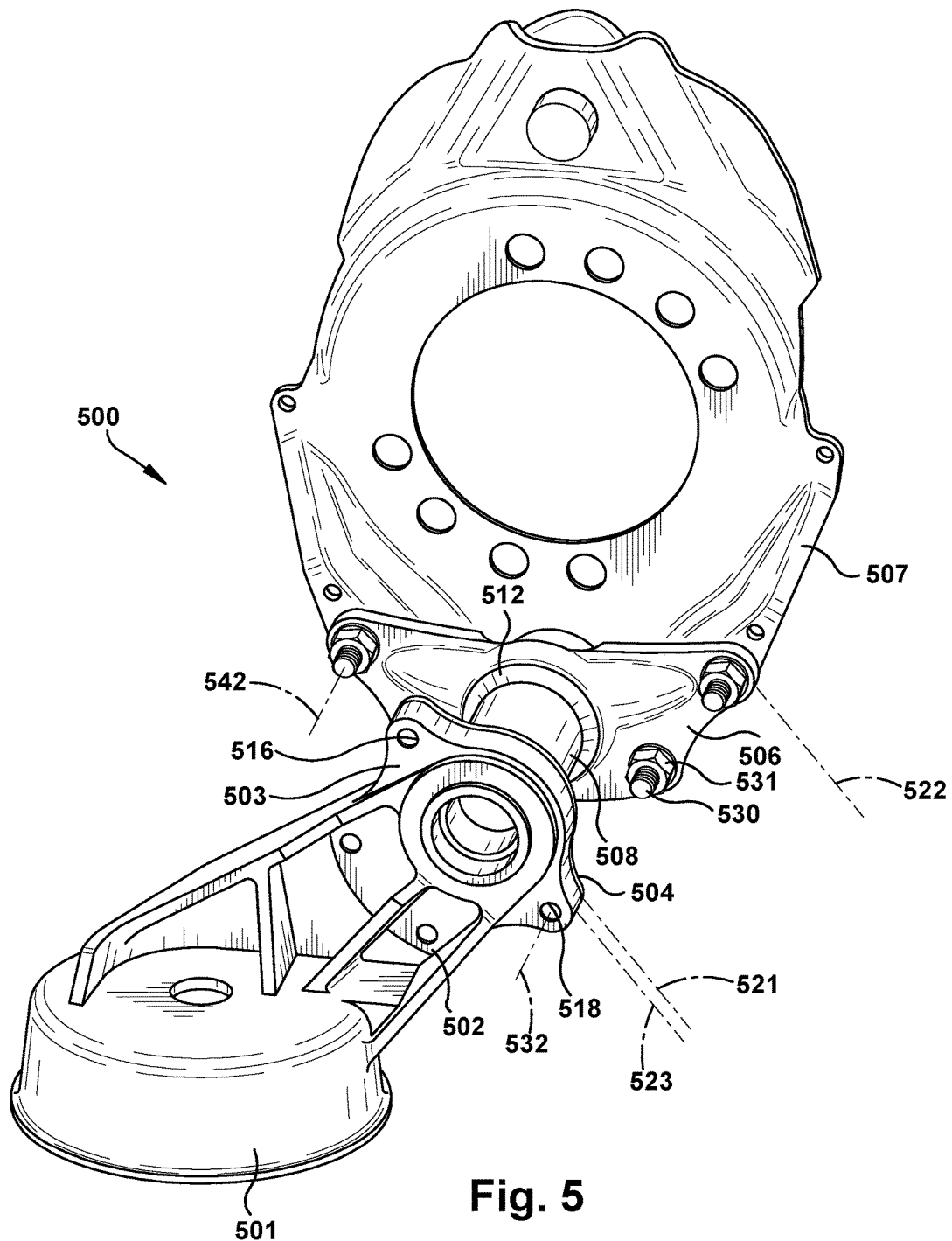
FIG. 5 is a perspective view of an example implementation of the hybrid structural apparatus of FIG. 1 in accordance with another embodiment.

Referring to FIG. 5, a perspective view of an example implementation of the hybrid structural apparatus 140 of FIG. 1 in accordance with another embodiment is illustrated. Since the example embodiment shown in FIG. 5 is similar to the example embodiment of FIG. 2-4, like reference numbers of FIGS. 2-4 are shown with numerals 300 higher in FIG. 5.

As shown in FIG. 5, a hybrid structural apparatus 500 comprises a member including a non-pressure plate 501 of a brake actuator, an arm portion 502 that extends from the non-pressure plate 501, and a flange portion 503 that extends from the arm portion 502. The non-pressure plate 501 is connected through the arm portion 502 to the flange portion 503. The member (i.e., the non-pressure plate 501, the arm portion 502, and the flange portion 503) is made of a first material. The hybrid structural apparatus 500 further includes a first flange 504 made of a second material fastened to the flange portion 503. The second material of the first flange 504 is different from the first material of the non-pressure plate 501, the arm portion 502, and the flange portion 503. The hybrid structural apparatus 500 also includes a second flange 506 fastened to a brake spider 507, and a camshaft support tube 508 that interconnects the first and second flanges 504, 506.

The first material of the non-pressure plate 501, the arm portion 502, and the flange portion 503 comprises cast aluminum. The material may comprise a different material. For example, the material of the non-pressure plate 501, the arm portion 502, and the flange portion 503 may comprise magnesium alloy. The second material of the first flange 504 comprises steel. The second flange 506 comprises steel, and the camshaft support tube 508 comprises steel. The brake spider 507 comprises steel. The material of the first flange 504, the second flange 506, the camshaft support tube 508, and the brake spider 507 may comprise a different material. For example, the material of the first flange 504, the second flange 506, the camshaft support tube 508, and the brake spider 507 may comprise ductile iron.

A first steel weld (blocked from view in FIG. 5) is disposed between the first flange 504 and the camshaft support tube 508 to connect the first flange 504 and the camshaft support tube 508 together. A second steel weld 512 is located between the second flange 506 and the camshaft support tube 508 to connect the second flange 506 and the camshaft support tube 508 together. The welds may comprise fillet welds, or for compactness, V-joint welds.

The non-pressure plate 501 has a number of self-locking thread inserts 516 facing the first flange 504. A number of bolts 518 pass through a corresponding number of bolt holes in the first flange 504 to engage the self-locking thread inserts 516 to fasten the first flange 504 and the flange portion 503 together. The first flange 504 lies in a substantially flat first plane 521. The second flange 506 lies in a substantially flat second plane 522. The flange portion 503 lies in a substantially flat third plane 523. The first, second, and third planes 521, 522, 523 are substantially parallel to each other. Each of the bolts 518 has a longitudinal central axis 532 (only one longitudinal central axis 532 shown in FIG. 5). The bolts 518 are a first fastening means.

A number of bolts 530 pass through a corresponding number of bolt holes in the brake spider 507 and the second flange 506 to engage a corresponding number of bolt nuts 531 to fasten the second flange 506 and the brake spider 507 together. Each of the bolts 530 has a longitudinal axis 542 (only one longitudinal central axis 542 shown in FIG. 5) that extends parallel to the longitudinal central axis 532 of each of the bolts 518 of the first fastening means. The bolts 530 are a second fastening means. Other types of fasteners are possible. For example, socket head bolts may be used to provide more compactness.

Accordingly, the hybrid structural apparatus 500 comprises two apparatus portions. The non-pressure plate 501, the arm portion 502, and the flange portion 503 comprise a first apparatus portion made of cast aluminum. The first flange 504, the second flange 506, and the camshaft support tube 508 that interconnects the first flange 504 and the second flange 506 comprise a second apparatus portion made of steel.

It should be apparent that a hybrid structural apparatus constructed in accordance with the above-described example embodiments modifies the overall weight distribution profile of the vehicle air braking system. As a result, any resonant vibration frequency associated with operation of the braking system would be shifted. As an example, an unstable vibration due to S-cam and camshaft vibrations would be shifted. It has been determined analytically that an unstable vibration frequency of about 1140 Hertz (Hz) can be effectively avoided by the hybrid design disclosed herein. By providing the ability to control and manipulate shifting of an unstable vibration frequency, some brake noise modes generated by the vehicle air braking system can be controlled. The design of the hybrid structure can be modified to tune the vibration characteristics to not be affected by the vibration normally seen at a wheel end. As an example, the design of the arm portion 202, 502 and the flange portion 203, 503 described herein can be modified to tune vibration characteristics.

It should also be apparent that a hybrid structural apparatus constructed in accordance with the above-described example embodiments combines the advantages of cast aluminum and welded steel. The cast aluminum includes the integrated unit of the non-pressure plate 201, 501, the arm portion 202, 502, and the flange portion 203, 503. The welded steel includes the weldment unit of the first flange 204, 504, the second flange 206, 506, and the camshaft support tube 208, 508 that interconnects the first and second flanges. The hybrid design allows weight or stiffness, or both, to be more easily optimized. The integrated cast aluminum unit provides less weight, particularly at the cantilevered end of the arm portion 202, 502, resulting in lower overall vehicle weight and less vibratory response at the arm portion 202, 502. Since even structural deflections normally occurring during brake operation increase air power consumption of the brake system, the increased stiffness of the welded steel unit results in less air consumption during a braking event.

It should also be apparent that a hybrid structural apparatus constructed in accordance with the above-described example embodiments provides design flexibility and economic manufacturing. Balancing and trading-off of mechanical properties between two different materials provide the design flexibility. The welded steel unit of the camshaft support tube and the first and second flanges provide not only strength and stiffness but also provides the design flexibility of lengths and angles required for a particular braking application. The integrated cast aluminum unit of the non-pressure plate, the arm portion, and the flange portion not only reduces weight but also reduces vibration loads that are induced during a braking event. Also, the casting of aluminum provides design flexibility that allows areas susceptible to vibration (e.g., the area between the non-pressure plate and the arm portion) to be cast thicker so as to avoid failure in these areas due to vibrations. The need for only a few casting molds provides for economic manufacturing. Also, the robotic fabrication of steel weldments of differing lengths and angles provides economic manufacturing.

It should further be apparent that a hybrid structural apparatus constructed in accordance with the above-described example embodiments is relatively easy to fabricate and assemble. The hybrid structural apparatus is also relatively easy to install in retrofit applications as well as new production applications.

Although the above description describes the hybrid structural apparatus being used in a heavy vehicle such as a truck, it is conceivable that the hybrid structural apparatus may be used in other types of commercial vehicles, such as busses for example.

While the present disclosure has been illustrated by the description of example processes and system components, and while the various processes and components have been described in detail, applicant does not intend to restrict or in any way limit the scope of the appended claims to such detail. Additional modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general concept.

What is claimed is:

1. A hybrid structural apparatus for a vehicle air braking system, the hybrid structural apparatus comprising:
    a monolithic member including a non-pressure plate of a brake actuator and an arm portion that extends from the non-pressure plate, wherein the monolithic member is made of a first material, the first material comprising cast aluminum;
    a first flange made of a second material fastened to the arm portion of the monolithic member, wherein the second material is steel;
    a second flange for fastening to a brake spider, the second flange comprising the second material;
    a camshaft support tube interconnecting the first and second flanges, the camshaft support tube comprising the second material;
    a first steel weld between the first flange and the camshaft support tube to connect the first flange and the camshaft support tube together; and
    a second steel weld between the second flange and the camshaft support tube to connect the second flange and the camshaft support tube together.

2. The hybrid structural apparatus according to claim 1, wherein the monolithic member includes a flange portion that extends from the arm portion, the flange portion having a plurality of self-locking thread inserts facing the first flange.

3. The hybrid structural apparatus according to claim 2, wherein (i) the first flange lies in a substantially flat first plane, (ii) the second flange lies in a substantially flat second plane, (iii) the flange portion lies in a substantially flat third plane, and (iv) the first, second, and third planes are substantially parallel to each other.

4. The hybrid structural apparatus according to claim 3, further comprising a plurality of bolts that pass through a corresponding number of bolt holes in the first flange to engage the self-locking thread inserts and thereby to fasten the first flange and the monolithic member together.

5. A hybrid structural apparatus for a vehicle air braking system, the hybrid structural apparatus comprising:
    a monolithic member including a non-pressure plate of a brake actuator and an arm portion that extends from the non-pressure plate, wherein the monolithic member is made of cast aluminum;
    a first flange made of steel and fastened to the arm portion of the monolithic member;
    a second flange made of steel and for fastening to a brake spider;
    a camshaft support tube made of steel and interconnecting the first and second flanges;

a first steel weld between the first flange and the camshaft support tube to connect the first flange and the camshaft support tube together; and a second steel weld between the second flange and the camshaft support tube to connect the second flange and the camshaft support tube together.

6. The hybrid structural apparatus according to claim 5, wherein the monolithic member includes a flange portion that extends from the arm portion, the flange portion having a plurality of self-locking thread inserts facing the first flange.

7. The hybrid structural apparatus according to claim 6, wherein (i) the first flange lies in a substantially flat first plane, (ii) the second flange lies in a substantially flat second plane, (iii) the flange portion lies in a substantially flat third plane, and (iv) the first, second, and third planes are substantially parallel to each other.

8. The hybrid structural apparatus according to claim 7, further comprising a plurality of bolts that pass through a corresponding number of bolt holes in the first flange to engage the self-locking thread inserts and thereby to fasten the first flange and the monolithic member together.

* * * * *